Feb. 8, 1949.　　　　E. J. ANDERSON　　　　2,461,249
VEGETABLE PEELING MACHINE INCLUDING
TRAVELING SCREW DRIVEN CUTTERS
Filed Nov. 20, 1944　　　　　　　　　　　　4 Sheets-Sheet 4
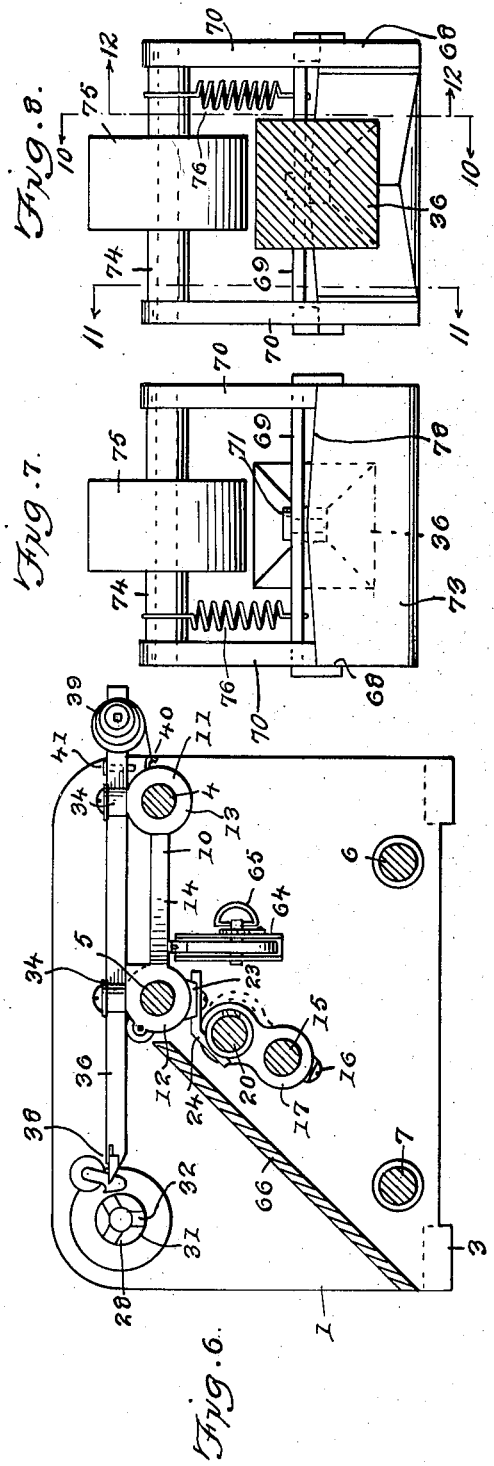
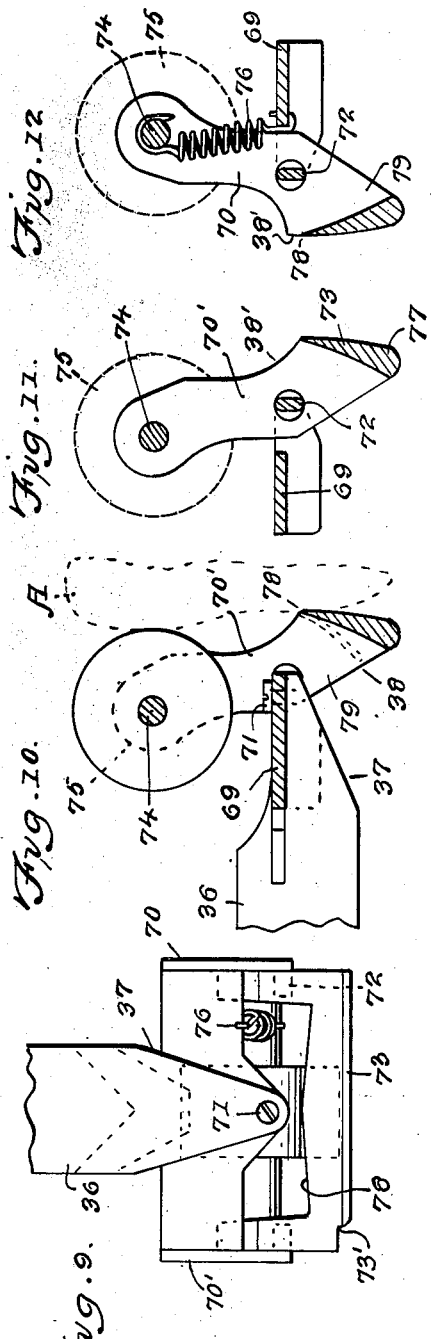
INVENTOR.
Edwin J. Anderson
BY
Victor J. Evans & Co.
ATTORNEYS Patented Feb. 8, 1949

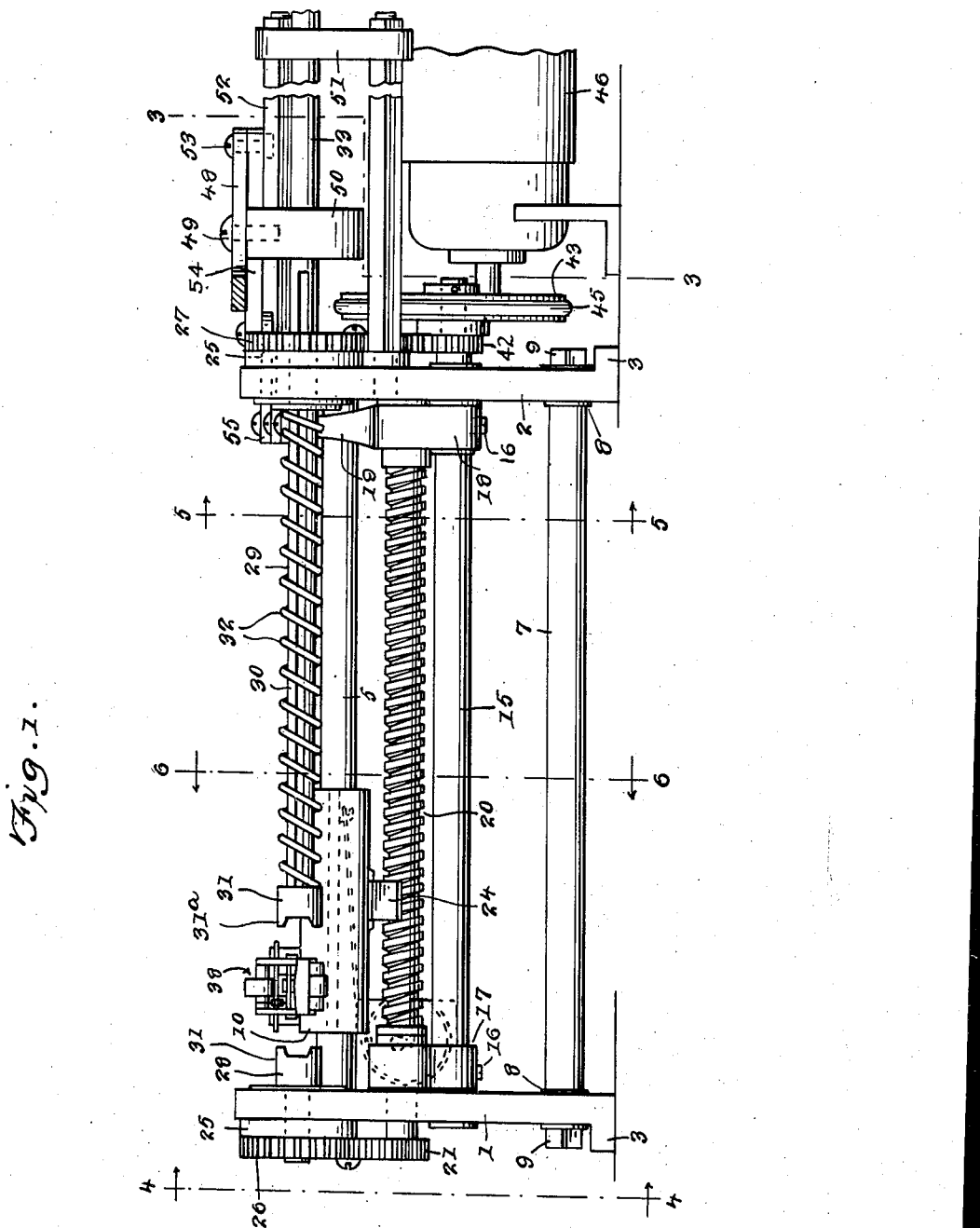

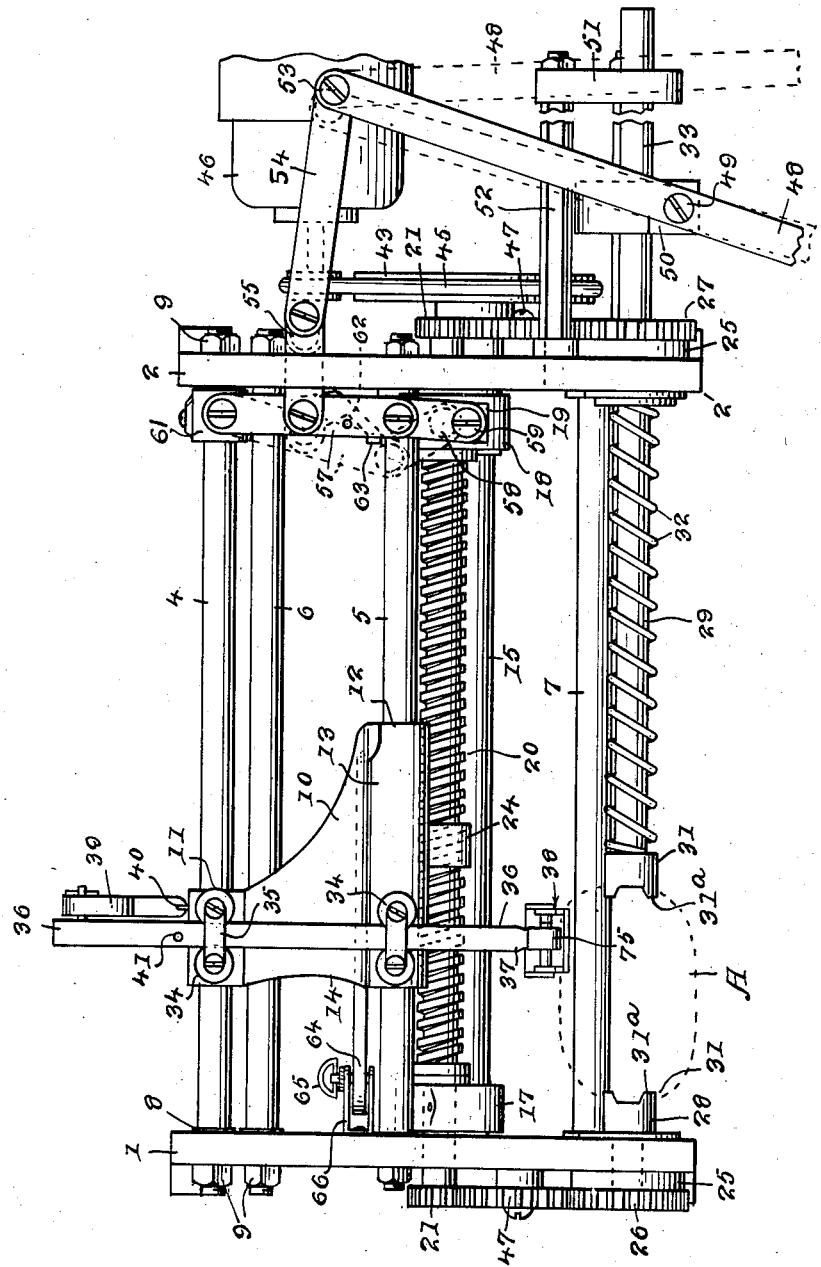

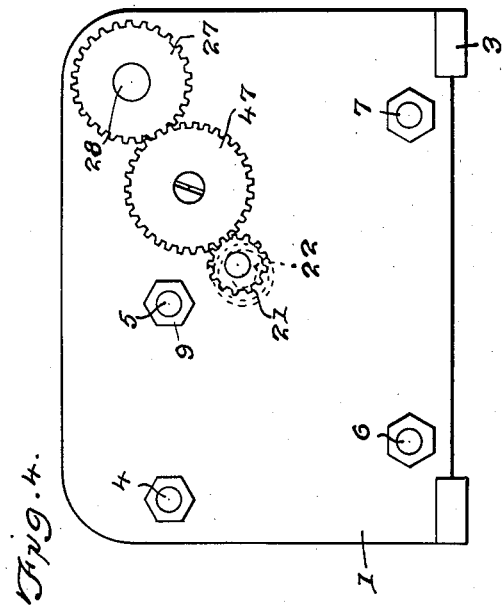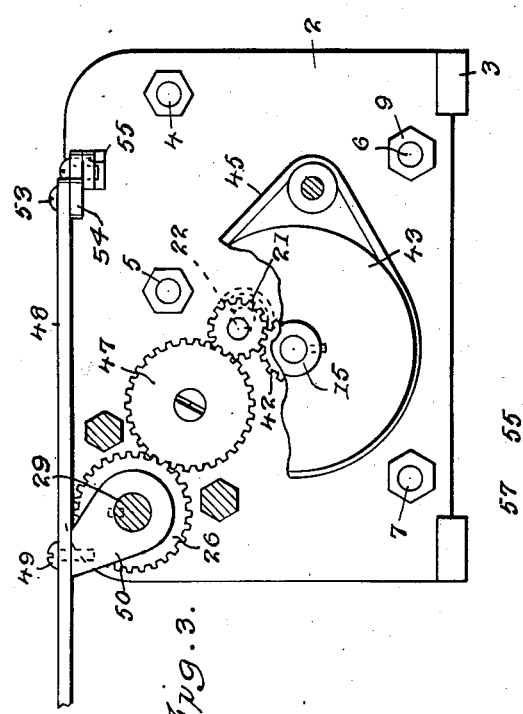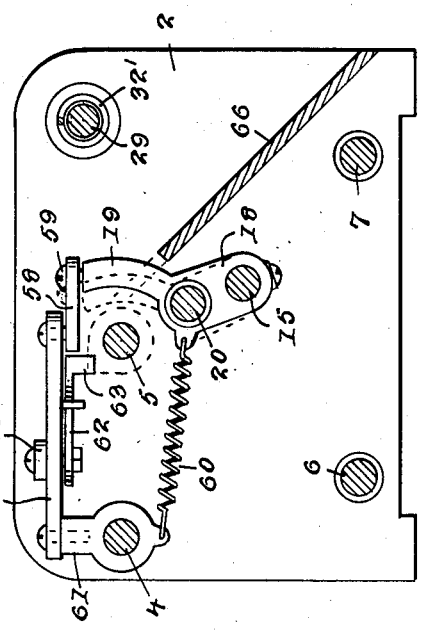

2,461,249

UNITED STATES PATENT OFFICE 2,461,249

VEGETABLE PEELING MACHINE INCLUDING TRAVELING SCREW DRIVEN CUTTERS

Edwin J. Anderson, Aurora, Ill.

Application November 20, 1944, Serial No. 564,233

3 Claims. (Cl. 146—43)

My present invention, in its broad aspect, has to do with improvements in vegetable peeling machines, and more particularly, it is my purpose to provide a machine of this character having simple, prompt and effective means for coupling and uncoupling operating parts to start and stop the machine, and also to provide means for automatically uncoupling the operating parts when the peeling element reaches the end of its stroke.

A further, and equally important, object of my invention is to provide a novel and unique peeling element which is sensitive to the various curvatures of the surface of a vegetable, such as a potato, and which will automatically adjust itself to elevations and declivities and the like to the end that a uniform and economical peeling is removed, and a minimum of surfaces of the vegetable skipped. To this end, my peeling element is not only provided with an improved knife, but a support for the knife, which is capable of automatic adjusting movement, about both horizontal, and vertical centers to present the cutting edge to a vegetable irrespective of vagaries in the shape and form of the vegetable, and spring means for urging the cutting edge toward the vegetable irrespective of the position of the edge.

Another, and important, object of my invention is to provide improved means for grasping and rotating a vegetable, such as a potato, in the most desirable position with respect to a peeling element, and at the same time move the peeling element to sever a peeling from the whole surface of the vegetable economically and effectively.

In addition to the above objects and advantages, my invention is designed to have relatively few operating parts, and those of sturdy construction and positive action, and to be easily cleaned and cared for. Other important objects and advantages will be apparent from the following detailed description taken in conjunction with the accompanying drawings, but changes in form, size, shape, proportion. construction and arrangement of parts are permissible provided they fall within the purview of my broad inventive concept.

In the drawings wherein I have illustrated a preferred form of my invention:

Figure 1 is a front elevation;

Figure 2 is a top plan view;

Figure 3 is a vertical section taken on the line 3—3 of Figure 1;

Figure 4 is an end view taken on the line 4—4 of Figure 1;

Figure 5 is a vertical section taken on the line 5—5 of Figure 1;

Figure 6 is a vertical section taken on the line 6—6 of Figure 1;

Figure 7 is a front elevational view of my peeling element;

Figure 8 is a rear elevational view of my peeling element;

Figure 9 is a bottom view of my peeling element, the general relationship of which to other parts is shown in Figure 2;

Figure 10 is a section through 10—10 of Figure 8 of my peeling element, a vegetable being shown in dotted lines;

Figure 11 is a section through 11—11 of Figure 8, and

Figure 12 is a section through 12—12 of Figure 8.

In the drawings wherein like characters of reference are used to designate like or similar parts throughout the several views:

The numerals 1 and 2 designate supporting frames or standards which are of plate-like construction and have foot flanges 3. Between the frames are the rods 4, 5, 6 and 7, each of which has an annular shoulder 8 against which the frames are held by nuts 9. On the rods 4 and 5 is slidably mounted a peeling element carriage 10. The carriage 10 has a narrow rear part 11 and a relatively wide front part 12 provided each with a sleeve-like mounting 13 through which rods 4 and 5 extend, and a thin flat web 14. Mounted for pivoting movement between the frames 1 and 2 is a shaft 15 to which are fixed by set screws 16, or the like, supporting brackets 17 and 18; these supporting brackets are adjacent and inside of frames 1 and 2 respectively, and bracket 18 has formed thereon an upstanding arm 19. Journaled in brackets 17 and 18 is a threaded shaft or lead screw 20 carrying pinions 21 at its ends outside of the frames 1 and 2. Frames 1 and 2 are formed with slightly elongated slots 22 so that some movement of threaded shaft 20 is permitted.

As shown in Figure 1, the carriage 10 has a depending arm 23 with a traveler or dog 24 engaging the threads of the threaded shaft or lead screw 20. Relatively mounted on bearings 25 on frames 1 and 2 are pinions 26 and 27; through the bearings 25 of which are mounted axially opposed and aligned arbors or shafts 28 and 29; the arbor or shaft 28 is relatively short and attached to pinion 26, and arbor or shaft 29 is keyed as at 30 for sliding movement through pinion 27 and driven thereby and is relatively long so that the space between the ends of the shafts can be adjusted. On the end of each shaft is a vegetable engaging head 31 of suitable form and configuration and which may have ribs or teeth 31A to prevent slipping of a vegetable therebetween. A vegetable A is shown in dotted lines. On the arbor or shaft 29 is a spring 32 which exerts its pressure to urge shaft 29 toward shaft 28 and shaft 29 is extended out a considerable distance as at 33 past the frame 2.

Mounted on the carriage 10 are two pairs of spaced aligned flanged rollers 34, each pair having a keeper 35 or guard to render stability. Mounted to slide between and in contact with the rollers, and extending transversely of the carriage is a bar 36 which is rectangular in cross section. It will be noted the flanges of rollers 34 extend under and over the bar to support the same. The bar is tapered at the front end as at 37 and carries the peeling element 38. A spiral spring 39 on the bar 36 and connected at its free end 40 to the carriage 10 normally urges the bar 36 and peeling element 38 forward toward the vegetable holders or heads 31 within the limit defined by the stop pin 41 engaging the rear edge of the carriage.

As heretofore stated, threaded shaft or lead screw 20 carries pinions 21. Pinion 21 at the right side of the machine—see Figures 1, 2 and 3—meshes with a drive gear 42 fixed to a drive pulley 43 rotating freely on the protruding end of shaft 15 and carrying a belt 45 to a suitable electric motor 46. Referring now to both ends of the machine—see Figures 1, 2, 3 and 4—pinions 21 also mesh with idler pinions 47 which, in turn mesh with pinions 26 and 27 on shafts or arbors 28 and 29. Accordingly, the shafts 28 and 29, and the threaded shaft or lead screw 29 are driven from drive gear 42 and motor 46; and since the carriage 10 has its dog or traveler 24 in engagement with threaded shaft or lead screw 20, the vegetable A is rotated at the same time the peeling element 38 is fed across the machine in contact with the vegetable to remove the skin.

However, as has been previously mentioned, the shaft 15 supports the threaded shaft or lead screw 20 by brackets 17 and 18 for limited pivoting movement. Pinions 21 being attached to this pivot shaft 20 move into and out of engagement with the driven idlers 47 thereby to rotate or not rotate shafts or arbors 28 and 29. Also, the lead screw or threaded shaft 20 is moved out of, or into, engagement with the dog or traveler 24 to actuate or release the carriage 10 carrying the peeling element 38. The dotted line positions of pinions 21 and shaft or lead screw 20 in Figures 3, 4, 5 and 6 indicate the uncoupled positions.

An operating lever 48 is pivoted at 49 secured to a mounting 50 on shaft 29 which is slidably supported at its free end in an arm 5 secured to a stub shaft 52 mounted on the frame 2. To the free end of lever 48 is pivoted at 53 a link 54 which is connected by a short link 55 to the longest 57 of two pivotally connected links 57 and 58; the shortest 58 of which is pivotally connected to upstanding arm 19—see Figures 1 and 5—as at 59. Accordingly, when the lever 48 is moved to the right to the dotted line position of Figure 2, the link 54 is moved slightly to the left bowing inwardly links 57 and 58 and moving arm 19 to pivot shaft 15—see Figure 5—thereby moving pinions 21 out of mesh with idlers 47 and cause the lead screw 20 to become disengaged from the dog or traveler 24, releasing the carriage 10. Movement of lever 48 to the left—full line position of Figure 2 re-engages or couples the above elements to actuate both the peeling elements 38 and the vegetable holding elements 31a.

The foregoing drive elements are normally held disengaged by spring 60 connected with bracket 18 and the support 61 for link 57 on rod 4. An automatic stop mechanism—see Figures 2 and 5—includes a pivoted angular arm 62 carrying a pin 63 which is engaged by the carriage 10 at the limit of its movement to the right to cause the links 57 and 58 to be moved off of the full line dead-center position of Figure 2 toward frame 2, to uncouple the gears 21 from the idlers 47 under the influence of spring 60 acting through arm 19. Spring 60 is of sufficient strength to fully uncouple the elements after dead right center is passed. A spring tension cable or tape 64—with adjusting key 65—attached to carriage 10 as at 65 and to the bracket 66 on frame 1 returns the carriage 10 to its normal starting position. A slanting floor 67 beneath the peeling element carries peelings forward to a suitable refuse basket (not shown).

The movement of lever 48 to the left slides shaft 29 back against the pressure of spring 32 to release a vegetable—such as a potato—from between the vegetable engaging means 31a or to permit the positioning of a vegetable therebetween to be peeled. Since the lever 48 must first overcome the action of the spring 32, a quick movement of the lever 48 to the right will first move the links 57 and 58 off dead-center to uncouple gears 21 from idlers 47 permitting the carriage 10 to be returned to its starting position.

Referring now especially to Figures 7, 8, 9, 10, 11 and 12, wherein the details of my peeling element are illustrated, it is emphasized that the peeling element constitutes one of the most important of the many features of my invention. The peeling element includes a frame 68 comprising a platform 69 and side members 70. The platform 69 is pivotally attached by a screw 71 to the end 37 of bar 36 to pivot in a horizontal plane, and the side members 70 are pivotally connected as at 72 on the platform to pivot on a vertical plane. Side members 70 and 70' have integrally formed thereon and extending therebetween a blade 73 and rotatably mounted on a shaft 74 at their upper ends is a guide roller 75. A spring 76 connected with shaft 74 and platform 69 normally tilts side members 70 and 70' (and the roller 75) backwardly and the blade 73 forwardly (see Figure 12) to hold the blade in proper position preparatory to peeling the vegetable A, with the roller acting as a depth gauge-like device following the surface of the vegetable to properly position the blade. It will be noted that the side member 70' is milled back, at 38' in Figure 11, to present the advance cutting portion of blade 73. The bottom side of the blade 73 is notched at 73' to permit this side of the blade 78 to penetrate while peeling. The opposite side member 70 terminates slightly above the blade 73, as at 38'' in Figure 12, to hold this side of the blade from penetrating into the peeled portion of the vegetable. Also, the blade is slightly arcuate and that the head 77 is relatively thick, the taper to the upwardly directed cutting edge 78 is slightly curved and the space 79 is provided to permit peelings to pass.

From the foregoing, it is believed that the operation and advantages of my invention will be apparent, but emphasis is laid upon the fact that interpretation of its scope should only be conclusive when made in the light of the subjoined claims.

I claim:
1. A vegetable peeling machine, comprising a frame, a threaded shaft, means for rotatably and oscillatively mounting the shaft on the frame, means for rotating the shaft, means for oscillating the shaft, a rotatable slidably mounted means for supporting a vegetable, means connected with the means for rotating the shaft for actuating the vegetable supporting means, means for sliding the vegetable supporting means to release a vegetable, a carriage slidably mounted on the frame and having a traveler engaging the shaft in one of its positions, a cutter on said carriage contacting a vegetable on the rotatable supporting means, automatic means actuated by the carriage for tilting the shaft to break the connection to the vegetable supporting means and release the traveler, and means for returning the carriage to its starting position.

2. The invention as described in claim 1 wherein the carriage has mounted thereon a sliding rod, a spring urging the rod forward, means for limiting the forward movement of the rod, said rod carrying the cutter at its forward edge, and said cutter contacting the vegetable in its forward position.

3. The invention as described in claim 1 wherein said means for rotating the shaft includes a pinion movable and rotatable with the threaded shaft and intermeshing with a drive gear and an idler pinion intergeared with a driven gear on the vegetable rotating means.

EDWIN J. ANDERSON.

REFERENCES CITED

The following references are of record in the file of this patent:

UNITED STATES PATENTS

| Number | Name | Date |
| --- | --- | --- |
| 1,008,555 | Mower | Nov. 14, 1911 |
| 1,399,858 | Gabrio | Dec. 13, 1921 |
| 1,445,147 | Kohler | Feb. 13, 1923 |
| 1,579,771 | Kools | Apr. 6, 1926 |